(12) United States Patent
Ogihara et al.

(10) Patent No.: US 9,415,476 B2
(45) Date of Patent: Aug. 16, 2016

(54) COOLANT APPLICATION DEVICE

(75) Inventors: Hideyuki Ogihara, Kitasaku-gun (JP); Masao Kato, Kitasaku-gun (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 545 days.

(21) Appl. No.: 13/430,039

(22) Filed: Mar. 26, 2012

(65) Prior Publication Data
US 2012/0267451 A1   Oct. 25, 2012

(30) Foreign Application Priority Data

Apr. 25, 2011   (JP) .................. 2011-097405

(51) Int. Cl.
*B23Q 11/10* (2006.01)
*B05B 9/08* (2006.01)
*A47L 9/04* (2006.01)

(52) U.S. Cl.
CPC .......... *B23Q 11/1076* (2013.01); *B05B 9/0861* (2013.01); *A47L 9/0411* (2013.01)

(58) Field of Classification Search
CPC . B23Q 11/1076; B05B 9/0861; A47L 9/0411
USPC ........ 239/263.1, 587.1, 587.5, 132.3, 265.11, 239/237, 241, 380, 381, 127.1, 240, 263.3; 408/56–61; 451/449
See application file for complete search history.

(56) References Cited

U.S. PATENT DOCUMENTS

| | | | | |
|---|---|---|---|---|
| 2,766,065 A * | 10/1956 | Joyslen | .................. | B05B 3/003 173/93.6 |
| 4,573,833 A | 3/1986 | Kondo | | |
| 4,690,325 A * | 9/1987 | Pacht | ...................... | B05B 3/026 239/124 |
| 4,811,902 A * | 3/1989 | Nagata | .................. | B05B 3/0422 134/181 |
| 5,452,854 A * | 9/1995 | Keller | ..................... | B05B 7/226 219/121.47 |
| 5,782,410 A * | 7/1998 | Weston | ........................... | 239/63 |
| 5,865,374 A * | 2/1999 | Barta et al. | ................. | 239/263.1 |
| 6,772,042 B1 | 8/2004 | Warren et al. | | |
| 2008/0050163 A1 * | 2/2008 | Malone et al. | ................ | 400/323 |

FOREIGN PATENT DOCUMENTS

| | | |
|---|---|---|
| CN | 2411077 Y | 12/2000 |
| CN | 1767924 A | 5/2006 |
| DE | 32 41 208 A1 | 5/1984 |
| DE | 33 38 434 A1 | 6/1984 |
| DE | 94 170 60 U1 | 12/1994 |
| DE | 103 33 981 A1 | 2/2005 |
| EP | 0631064 A1 | 12/1994 |
| GB | 2 134 016 A | 8/1984 |
| JP | S58-155834 A | 9/1983 |
| JP | H08-243876 A | 9/1996 |
| JP | A-2002-018674 | 1/2002 |
| WO | 84/01737 A1 | 5/1984 |

OTHER PUBLICATIONS

Dec. 23, 2015 Office Action issued in German Patent Application No. 10 2012 103 632.2.

* cited by examiner

*Primary Examiner* — Len Tran
*Assistant Examiner* — Alexander Valvis
(74) *Attorney, Agent, or Firm* — Oliff PLC

(57) ABSTRACT

A coolant application device includes a nozzle which spouts coolant and a motor which adjusts the rotation angle of the nozzle. The coolant application device also includes a housing, a hollow shaft rotatively and fluid-tightly inserted into the housing, a coolant passage formed in the hollow shaft, a port arranged at a lateral wall of the hollow shaft and communicating with the coolant passage, and an inlet passage arranged in the housing and communicating with the coolant passage through the port. The nozzle is connected to the hollow shaft and communicates with the coolant passage. The hollow shaft is coaxially arranged and directly connected to an output shaft of the motor.

6 Claims, 7 Drawing Sheets

COOLANT APPLICATION DEVICE

BACKGROUND OF THE INVENTION

1. Field of the Invention

The present invention relates to a coolant application device for applying coolant to the processing area of workpiece when machining the workpiece with a machine tool.

2. Description of the Related Art

In general, when conducting machine works such as cutting or grinding with machine tools, the machine works are processed while supplying coolant to the processing area of the workpiece for lubrication, cooling, chip removal, metal adhesion prevention, etc. In the machine works, for ensuring the stability and precision of the process, it is desired that coolant is properly supplied to the processing parts of the workpiece. Here, as explained in Japanese Patent Application Laid-open No. 2002-18674 and U.S. Pat. No. 6,772,042, in automatic machine tools such as machining centers or other NC machine tools, different types of coolant application device with adjustable coolant nozzle angle have been proposed. With these types of coolant application device, which allow the coolant nozzle angle to be automatically adjusted according to the development of metalworking process, coolant is properly supplied to the processing area of the workpiece.

In the above kinds of the coolant application device, a nozzle which spouts coolant is rotated by a servomotor. By adjusting the position and the angle of the nozzle after a tool change or according to the development of machining process, coolant is precisely applied to the processing area of the workpiece.

Since the coolant application device tend to be exposed to coolant droplets or chip dispersion during machine works, the servomotor driving the nozzle, the reduction gear device, etc. need to be provided with sufficient waterproof and dust-resistance properties. Further, since the coolant application device needs to be mounted in a limited space of the automatic machine tools such as machining centers or other NC machine tools, downsizing of the coolant application device has been demanded.

SUMMARY OF THE INVENTION

The present invention has been made in view of the above circumstances, and it is an object of the present invention to provide a coolant application device which has excellent waterproof and dust-resistance properties while achieving requirements to be downsized.

Embodiments according to the present invention hereinbelow exemplify some structures of the present invention, and are itemized for facilitating understanding of various structures of the present invention. Each item does not intend to limit the technical scope of the present invention. While considering the best modes to carry out the present invention, even if components of each item is partially substituted or deleted, or even if another component is added thereto, these should be regarded as the elements of the technical scope of the present invention.

In order to achieve the object described above, the present invention provides a coolant application device including a nozzle which spouts coolant and a motor which adjusts the rotation angle of the nozzle. The coolant application device also includes a housing, a hollow shaft which is rotatively and fluid-tightly inserted into the housing and has a coolant passage therein, a port which is arranged at a lateral wall of the hollow shaft and communicates with the coolant passage, and an inlet passage which is arranged in the housing and communicates with the coolant passage through the port. The nozzle is connected to the hollow shaft and communicates with the coolant passage. The hollow shaft is coaxially arranged and directly connected to an output shaft of the motor.

Since the coolant supplied from the inlet passage will flow into the coolant passage of the hollow shaft through the port arranged at the lateral wall of the hollow shaft, the fixed inlet passage does not need to be connected directly with the rotatable hollow shaft by means of joint parts. Accordingly, it is possible to prevent the leakage of coolant due to defects of the joint parts. Further, since the coolant is supplied to the nozzle through the hollow shaft, the coolant application device can be downsized. Still further, since parts to be sealed are minimized, it is possible to improve drip-proof properties and dust-resistance properties.

In one aspect of the present invention, the hollow shaft and the output shaft of the motor are integrally formed as one piece.

Because of the integration of the hollow shaft and the output shaft of the motor, it is possible to reduce the number of parts.

In another aspect of the present invention, the motor is a stepping motor.

Since the stepping motor is used, it is possible to perform an open-loop control, contributing to the simplification of the control circuit.

DETAILED DESCRIPTION OF THE PREFERRED EMBODIMENTS

Figure 1:
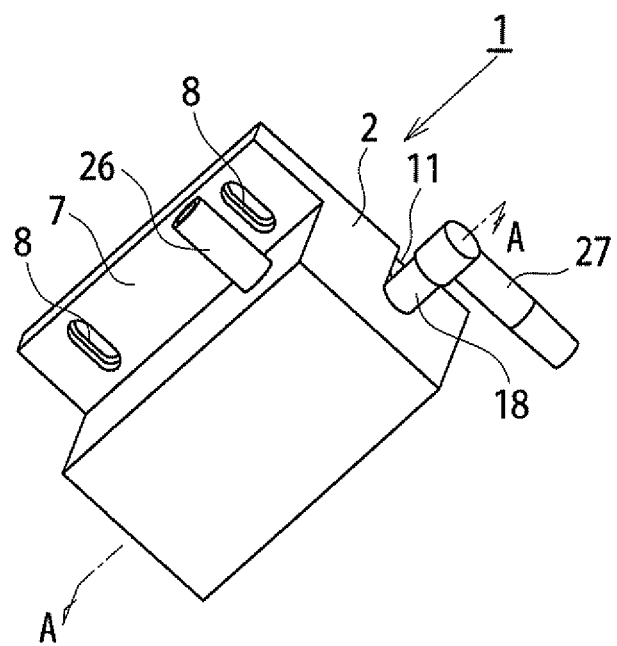
FIG. 1 is a perspective view of a coolant application device according to the first embodiment of the present invention.
Figure 2:
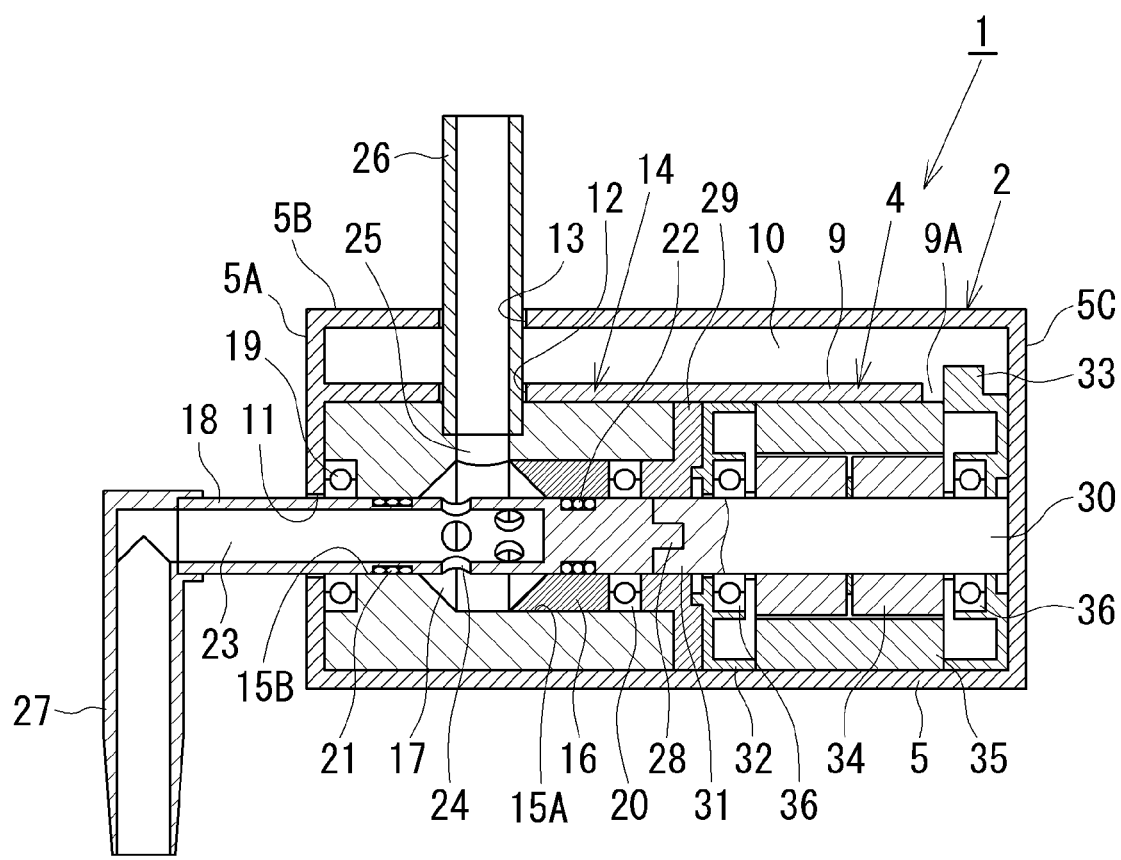
FIG. 2 is an A-A cross sectional view of the coolant application device.
Figure 3:
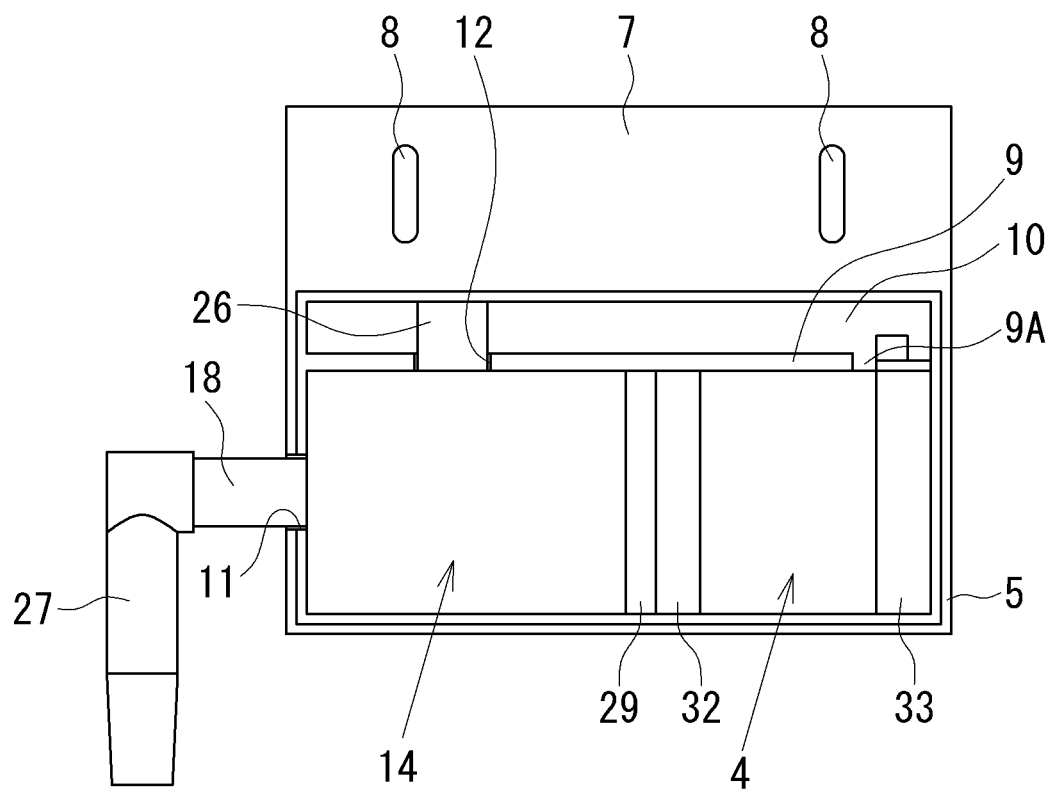
FIG. 3 is a plan view of the coolant application device where a cover thereof is removed.
Figure 4:
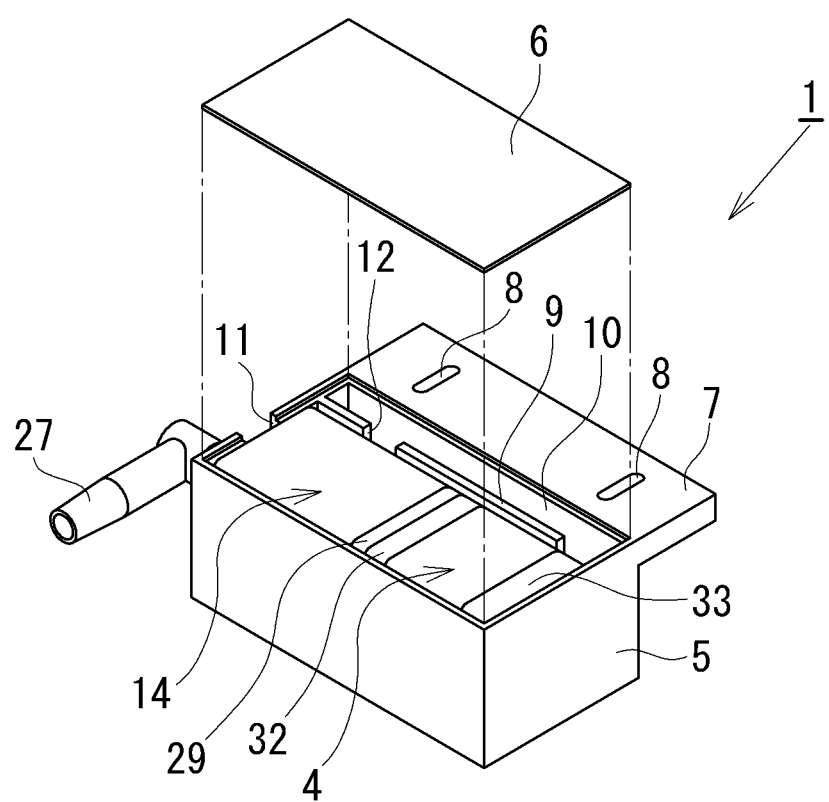
FIG. 4 is a perspective view of the coolant application device where the cover thereof is removed.
Figure 5:
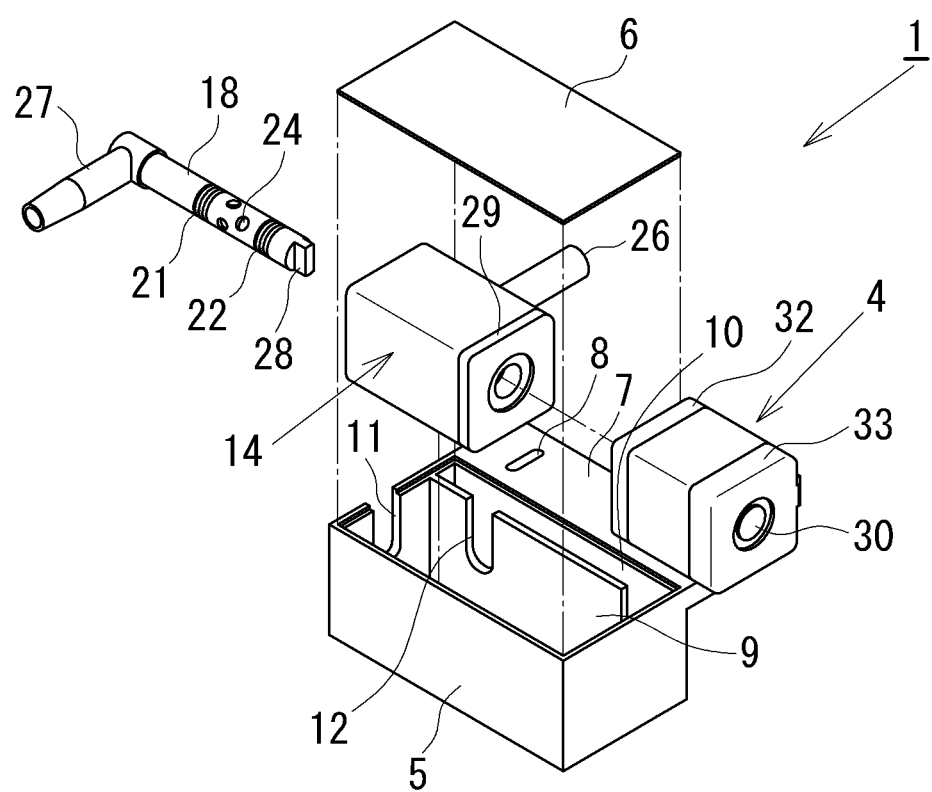
FIG. 5 is an exploded perspective view of the coolant application device.

Embodiments of the present invention will be explained hereinafter with reference to the accompanying drawings. To begin with, the first embodiment of the present invention is explained based on FIGS. 1 to 5. A coolant application device 1 of the first embodiment is mounted at a numerically controlled (NC) machine tool such as an NC drilling machine, an NC milling machine, an NC lathe, a machining center, etc. so as to apply coolant to the processing zone of workpiece. In the coolant application device 1, a housing 14 and a motor 4 are integrally housed (unitized) in a case 2.

The case 2 looks approximately like a rectangular solid and is composed of a box-shaped case main body 5 which has one open side, and a cover 6 which seals the open side of the case main body 5. In the case 2, a rectangular mounting portion 7 is formed integrally with the case main body 5. The mounting portion 7 extends to form a flat plate continuing the cover 6.

The mounting portion 7 is provided with a pair of elongated holes 8, 8 by which the case 2 is mounted to automatic machine tools, etc.

The interior of the case 2 is divided by a sealing plate 9 which is formed integrally with and extends in a longitudinal direction of the case main body 5. Further, in the case main body 5, a wiring chamber 10 is formed next to the chamber in which the housing 14 and the motor 4 are housed. The wiring chamber 10 serves for wiring the lead wires connected to the motor 4. Approximately U-shaped cutouts 11, 12 are each formed respectively at the sealing plate 9 and at the lateral wall 5A of the case main body 5 (the lateral wall closer to the housing 14). An opening 13 (see FIG. 2) is formed on the lateral wall 5B (see also FIG. 2) of the case main body 5 facing the cutout 12 of the sealing plate 9. At the end of the case main body 5 where the motor 4 is positioned, a clearance 9A for connecting the lead wire to the motor 4 is formed.

The cover 6 is mounted on the opening portion of the case main body 5 by means of a well-known fixing means (not shown) such as screws, fasteners, adhesives, etc. The case main body 5 and the cover 6 are sealed to each other by means of a well-known sealing means (not shown) such as packing. The cover 6 is preferably mounted on the case main body 5 in a removable manner by means of a removable fixing means such as screws, and the like. The case 2 is made of any appropriate materials such as synthetic resin, aluminum alloy, steel, etc.

The housing 14 has an external shape of an approximately rectangular solid. A stepped opening portion which includes a large diameter bore 15A and a small diameter bore 15B penetrates into the housing 14. A cylindrical guide member 16 is fluid-tightly fitted into the large diameter bore 15A while a nozzle chamber 17 is formed between the small diameter bore 15B and the guide member 16. A hollow shaft 18 which penetrates the housing 14 is rotatively and fluid-tightly inserted into the small diameter bore 15B and the guide member 16. The hollow shaft 18 is rotatively supported by bearings 19, 20 arranged at both ends of the housing 14. The hollow shaft 18 and the small diameter bore 15B, and the hollow shaft 18 and the guide member 16 are each sealed by means of an O-ring 21 and an O-ring 22, respectively.

The hollow shaft 18 has a coolant passage 23 which extends along the central axis of the hollow shaft 18. One end of the coolant passage 23 opens at one end of the hollow shaft 18 while the other passage end is closed. Further, a plurality of ports 24 are provided on the lateral wall of the hollow shaft 18, which enables the coolant passage 23 and the nozzle chamber 17 to communicate with each other. An inlet passage 25 is provided on the lateral wall of the housing 14 so as to communicate to the nozzle chamber 17 while a cylindrical inlet duct 26 is connected to the inlet passage 25. A nozzle 27 is connected to the open end of the hollow shaft 18, the nozzle 27 being directed perpendicularly relative to the hollow shaft 18. Consequently, the coolant passage 23 communicates with the interior of the nozzle 27. A protruding joint 28 with two flat faces is formed at the closed end of the hollow shaft 18. At the end of the housing 14 (the side where the large diameter bore 15A is positioned), a convex rear cover 29 with an opening is fitted. The closed end of the hollow shaft 18 is inserted into the opening of the rear cover 29. The housing 14 is mounted on the case main body 5 in such a manner that 1) the open end of the hollow shaft 18 to which the nozzle 27 is connected is inserted into the cutout 11, and 2) the inlet duct 26 is inserted into the cutout 12 and the opening 13.

The motor 4 is configured as that its external shape is like a rectangular solid approximately similar to the housing 14. Further, the first end of the output shaft 30 is provided with a grooved joint 31 which is engaged with the protruding joint 28 configured at the closed end of the hollow shaft 18. The motor 4, which can be a well-known servo motor or stepping motor, controls the rotation angle of the output shaft 30. Further, in the stepping motor, a variable reluctance type, a permanent magnet type, or a hybrid type which is a combination of the previous two types may be used. In the present embodiment, a hybrid type stepping motor is used since the adjustable step angle is sufficiently small. A lead wire (not shown) which supplies control current is connected to the motor 4. The lead wire extends into the wiring chamber 10 passing through the clearance 9A of the sealing plate 9, and further is connected to an external drive circuit (not shown) through an electrical connector (not shown) mounted on the outer wall of the case 2.

In the motor 4, its front cover 32 is engaged with the rear cover 29 of the housing 14 while the rear cover 33 of the motor 4 is abutted to and fixed at the inner surface of the lateral wall 5C of the case main body 5. Here, in FIG. 2, the reference numeral 34 indicates a rotor which is connected to the output shaft 30, the reference numeral 35 is a stator which is arranged so as to face the periphery of the rotor 34, and the reference numeral 36 is a bearing which rotatively supports the output shaft 30.

The housing 14 and the motor 4 are integrally housed in the case main body 5 in such a manner that the output shaft 30 of the motor 4 is inserted into the rear cover 29 on the side of the housing 14; and the joint 31 of the output shaft 30 is engaged with the joint 28 of the hollow shaft 18. The housing 14 and the motor 4 are then both fixed to the case 2 by which the cover 6 is mounted on the opening portion of the case main body 5. Here, the contour of the joint 28 of the hollow shaft 18 and the contour of the joint 31 of the output shaft 30 are not limited to the double-face configuration. Instead, as long as the joint 28 and the joint 31 are able to transmit the rotation from the output shaft 31 to the hollow shaft 18, any other shape is applicable.

While directing the nozzle 27 in a proper direction, the coolant application device 1 thus structured is installed in automatic machine tools such as machining centers or other type of NC machine tools, by inserting bolts into the elongated holes 8 of the mounting portion 7. Further, the inlet duct 26 is connected to the coolant supply source including pump or the like while the motor 4 is connected to the drive circuit which supplies control current.

Then, the coolant is supplied to the inlet duct 26, and spouts from the nozzle 27 through the inlet passage 25, the nozzle chamber 17, the ports 24 and the coolant passage 23. By rotating the output shaft 30 of the motor 4, the rotation angle of the hollow shaft 18 connected to the output shaft 30 can be controlled. Accordingly, the angle of the nozzle 27 can be adjusted which enables the coolant to be directed in any desired directions. Here, it is also possible to omit the nozzle chamber 17 arranged within the housing 14. With this configuration, the coolant can be supplied directly from the inlet passage 25 to the ports 24 of the hollow shaft 18.

When it is necessary to adjust the initial position of the rotation angle (zero adjustment) of the hollow shaft 18, that is, the output shaft 30 of the motor 4, a hall element (not shown) may be installed to the hollow shaft 18 or the output shaft 30. Based on the detected position of the rotation angle, the zero adjustment can be performed. Alternatively, the zero adjustment can be performed by limiting the rotation range of the nozzle 27 with a stopper. The nozzle 27 is rotated until it is abutted to the stopper and, based on the position where the nozzle 27 is abutted to the stopper, the zero adjustment is performed.

Due to the above configuration, the rotation angle of the nozzle 27 can be adjusted in accordance with the change of the tool end position after a tool change in the automatic machine tool, or in accordance with the change of the distance between the nozzle and the processing position as the machining process advances. Thus, the coolant can be applied accurately to the specific processing position. Here, since the stepping motor is used as the motor 4, an open-loop control becomes possible. Compared with a case of a closed-loop control using a servo-motor, it is possible to further simplify the drive circuit of the motor.

When controlling the rotation angle of the nozzle 27, besides adjusting the nozzle angle for directing the coolant accurately to the cutting area, the nozzle 27 may be intentionally swung in a wide angle so that coolant can effectively sweep away the chips in the cutting area. Further, the rotation of the nozzle may be performed at a constant speed or a variable speed. Still further, by using the stepping motor as the motor 4, the control codes of NC machine tools for tool change or tool specification (that is, M codes or T codes) become usable as control signals of the motor 4. Accordingly, this makes possible to control the rotation angle of the nozzle 27 to track the processing area, thereby contributing to simplify the control circuits of the coolant application device.

By being able to flow coolant into the coolant passage 23 provided within the hollow shaft 18 which rotates the nozzle 27, the miniaturization of the coolant application device 1, especially, the dimensional reduction in its axial direction becomes possible. Moreover, by eliminating portions to be sealed as much as possible, drip-proof properties and dust-proof properties are notably enhanced. Further, by configuring the cover 6 as a detachable part, it becomes possible to individually replace or fix the housing 14 or the motor 4 even if one of them fails. Ease of maintenance can be thus achieved.

Next, the second embodiment of the present invention will be explained with reference to FIGS. 6 and 7. Here, identical parts recited in the first embodiment of the present invention is identified with the same reference numerals, and only parts not described in the first embodiment will be explained in details.

Figure 6:
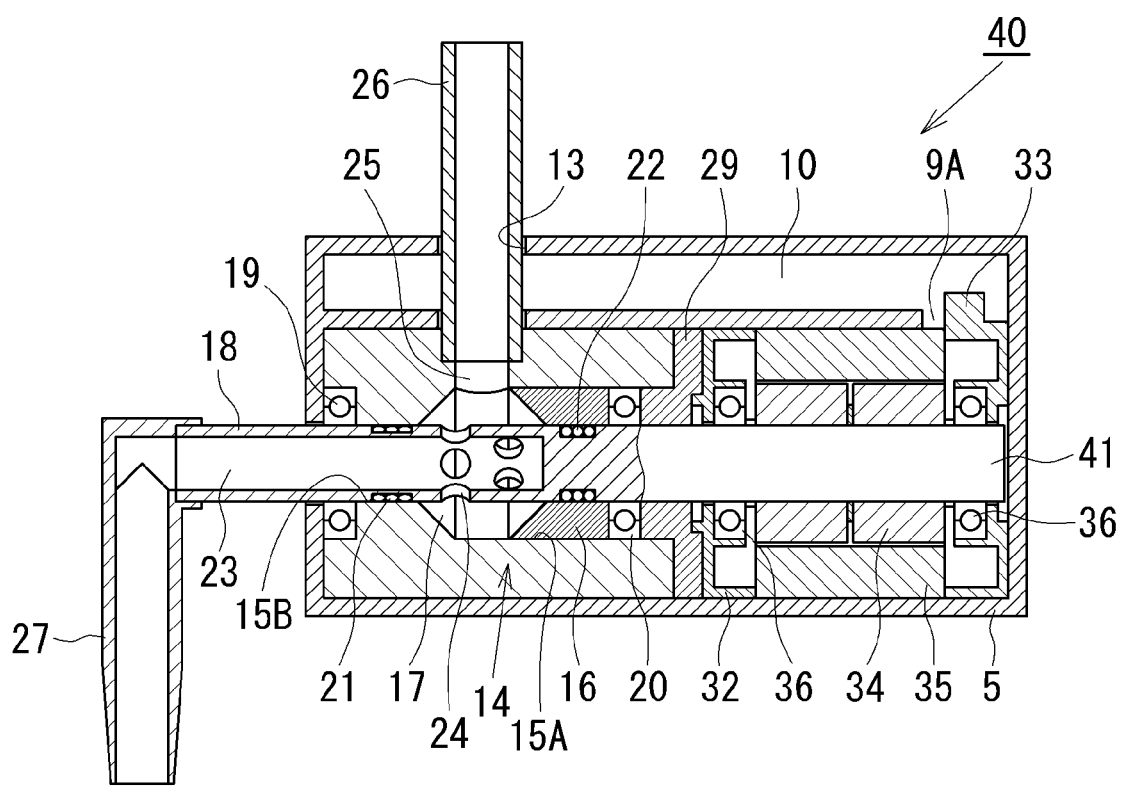
FIG. 6 is a cross sectional view of a coolant application device according to the second embodiment of the present invention.
Figure 7:
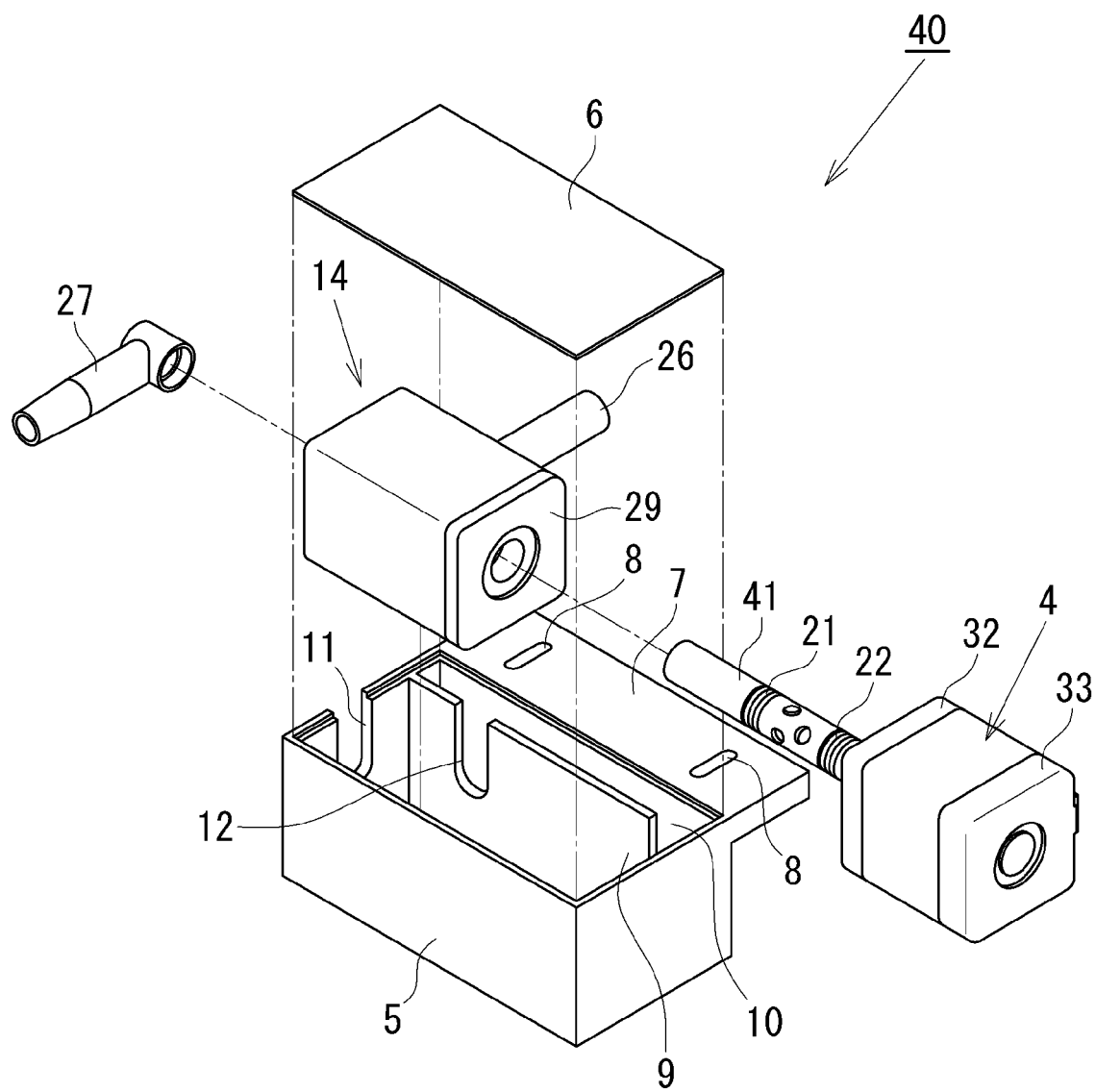
FIG. 7 is an exploded perspective view of the coolant application device of the second embodiment.

As shown in FIGS. 6 and 7, in a coolant application device 40, the hollow shaft 18 of the housing 14 and the output shaft 30 of the motor 4 of the first embodiment are integrally formed to each other so as to configure a hollow motor shaft 41. As shown in the example of FIG. 7, the hollow motor shaft 41 is installed in the motor 4 in advance, and is then inserted into the housing 14. Alternatively, the hollow motor shaft 41 may be installed into the housing 14 in advance, and then inserted into or press-fitted to the motor 4. Due to this structure, the coolant application device of the second embodiment will enjoy the advantageous effects identical with the first embodiment.

What is claimed is:

1. A coolant application device, comprising:
   a housing having a large diameter bore portion and a small diameter bore portion;
   a guide member fitted into the large diameter bore portion;
   a nozzle that spouts coolant;
   a hollow shaft that has a coolant passage therein and is connected with the nozzle, the hollow shaft being rotatively and fluid-tightly inserted into the housing;
   a hybrid stepping motor that has an output shaft and adjusts a rotation angle of the nozzle to direct the coolant to a desired angle;
   a plurality of ports that are arranged at a lateral wall of the hollow shaft and communicate with the coolant passage; and
   an inlet passage that is arranged in the housing and communicates with the coolant passage through the plurality of ports wherein:
   the hollow shaft coaxially engages with an output shaft of the motor in a space of the housing, the motor and the housing being arranged in series along an axial direction of both of the hollow shaft and the output shaft of the motor,
   the motor and the housing directly engage each other,
   a nozzle chamber is formed in the large diameter bore portion between the small diameter bore portion and the guide member,
   the plurality of ports are located in the nozzle chamber, and
   the nozzle chamber is configured to be wider than the inlet passage.

2. A coolant application device as recited in claim 1, wherein the hollow shaft is further provided with a joint configured to transmit rotation from the output shaft of the motor to the hollow shaft.

3. A coolant application device as recited in claim 2, wherein the joint has a double-face configuration.

4. A coolant application device as recited in claim 1, wherein the motor and housing are adapted to be installed in a box-shape case main body of a case of the coolant application device, the motor and housing being utilizable while in the case.

5. A coolant application device, comprising:
   a housing having a large diameter bore portion and a small diameter bore portion;
   a guide member fitted into the large diameter bore portion;
   a hybrid stepping motor with a hollow motor shaft made of a single individual piece, the hollow motor shaft being provided with a coolant passage therein and being rotatively and fluid-tightly inserted into the housing;
   a nozzle being connected with the hollow motor shaft, a rotation angle of the nozzle being adjustable by the hybrid stepping motor to direct coolant to a desired angle;
   a plurality of ports that are arranged at a lateral wall of the hollow motor shaft and communicate with the coolant passage;
   an inlet passage that is arranged in the housing so as to communicate with the coolant passage through the plurality of ports;
   wherein the hollow motor shaft is configured to allow the coolant to pass through therein,
   wherein the motor and the housing directly engage each other,
   wherein a nozzle chamber is formed in the large diameter bore portion between the small diameter bore portion and the guide member,
   wherein the plurality of ports are located in the nozzle chamber, and
   wherein the nozzle chamber is configured to be wider than the inlet passage.

6. A coolant application device as recited in claim 5, wherein the motor and housing are adapted to be installed in a box-shape case main body of a case of the coolant application device, the motor and housing being utilizable while in the case.

* * * * *